(12) United States Patent
Christoph (10) Patent No.: US 10,979,100 B2
(45) Date of Patent: Apr. 13, 2021

(54) AUDIO SIGNAL PROCESSING WITH ACOUSTIC ECHO CANCELLATION

(71) Applicant: Harman Becker Automotive Systems GmbH, Karlsbad (DE)

(72) Inventor: Markus Christoph, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/662,904

(22) Filed: Oct. 24, 2019

(65) Prior Publication Data

US 2020/0136675 A1    Apr. 30, 2020

(30) Foreign Application Priority Data

Oct. 30, 2018 (DE) .................. 102018127071.2

(51) Int. Cl.
| | | |
|---|---|---|
| *H04B 3/23* | (2006.01) | |
| *G10L 19/008* | (2013.01) | |
| *H04S 3/02* | (2006.01) | |

(52) U.S. Cl.
CPC .............. *H04B 3/23* (2013.01); *G10L 19/008* (2013.01); *H04S 3/02* (2013.01); *H04S 2420/03* (2013.01)

(58) Field of Classification Search
CPC . G10L 19/008; H04B 3/23; H04S 3/02; H04S 2420/03
See application file for complete search history.

(56) References Cited

U.S. PATENT DOCUMENTS

| | | |
|---|---|---|
| 6,895,093 B1 | 5/2005 | Ali |
| 7,394,903 B2 | 7/2008 | Herre et al. |
| 7,508,947 B2 | 3/2009 | Smithers |
| 7,668,722 B2 | 2/2010 | Villemoes et al. |
| 8,085,947 B2* | 12/2011 | Haulick ................ H04M 9/082 381/93 |
| 2008/0247558 A1 | 10/2008 | Laroche et al. |
| 2009/0304198 A1 | 12/2009 | Herre et al. |
| 2012/0063609 A1 | 3/2012 | Triki et al. |
| 2014/0307882 A1* | 10/2014 | LeBlanc ................ H04S 7/305 381/66 |
| 2015/0030172 A1* | 1/2015 | Gaensler ................ H04R 3/02 381/71.2 |

FOREIGN PATENT DOCUMENTS

| | | |
|---|---|---|
| EP | 2154911 A1 | 2/2010 |
| EP | 2420050 B1 | 4/2013 |

* cited by examiner

*Primary Examiner* — Hemant S Patel
(74) *Attorney, Agent, or Firm* — McCoy Russell LLP (57) ABSTRACT

Multi-channel audio signal processing includes receiving a left stereo audio signal from a first channel and a right stereo audio signal from a second channel; up-mixing the left and the right stereo audio signals to generate an up-mixed audio signal for a third channel; de-correlating the up-mixed audio signal from the left and the right stereo audio signals to generate a de-correlated up-mixed audio signal; providing the left and right stereo signals and the de-correlated up-mixed audio signal to first, second, and third loudspeakers respectively to generate first, second, and third sound signals, respectively; picking up the first, second and third sound signals with a microphone to generate a microphone output signal; and adaptively filtering the microphone output signal with an acoustic echo canceller based on the left, the right, and the de-correlated up-mixed audio signal to generate an echo compensated microphone signal.

20 Claims, 6 Drawing Sheets

AUDIO SIGNAL PROCESSING WITH ACOUSTIC ECHO CANCELLATION

CROSS REFERENCE TO RELATED APPLICATIONS

The present application claims priority to German Patent Application No. 102018127071.2 entitled "AUDIO SIGNAL PROCESSING WITH ACOUSTIC ECHO CANCELLATION", and filed on Oct. 30, 2018. The entire contents of the above-identified application is incorporated by reference for all purposes.

TECHNICAL FIELD

The disclosure relates to a method for acoustic echo cancelling, and an acoustic echo cancelling controller.

BACKGROUND

Acoustic echo cancellation removes an echo captured by a microphone when a sound is simultaneously played through loudspeakers located in the vicinity of the microphone. In echo cancellation, complex algorithmic procedures may be used to compute speech echo models. This involves generating the sum from reflected echoes of an original speech and then subtracting this from any signal the microphone picks up. The result is the purified speech of a person talking. The format of this echo prediction is learned by an echo canceller in a process known as adaptation.

Multi-channel acoustic echo cancellation addresses a multiplicity of echoes which occur when, for example, a multiplicity of loudspeakers in combination with one microphone or a multiplicity of loudspeakers with a multiplicity of microphones are employed. Multi-channel acoustic echo cancellation exhibit some drawbacks when an inter-correlation exists between some or all of the signals supplied to the loudspeakers. When the individual channels are correlated, the adaptive filters may not be able to converge to the real room transfer functions, also referred to as room impulse responses (RIRs), because portions of signals broadcast by one loudspeaker may be compensated by a filter that processes the output of a different loudspeaker. A need exists for multi-channel audio processing with acoustic echo cancelling which is able to converge to the real RIRs.

SUMMARY

An example method for multi-channel audio signal processing includes receiving a left stereo audio signal from a first channel, and receiving a right stereo audio signal from a second channel; up-mixing the left stereo audio signal and the right stereo audio signal to generate an up-mixed audio signal for a third channel; and de-correlating the up-mixed audio signal from the left stereo audio signal and the right stereo audio signal to generate a de-correlated up-mixed audio signal. The method further includes providing the left stereo audio signal to a first loudspeaker to generate a first sound signal, providing the right stereo audio signal to a second loudspeaker to generate a second sound signal, and providing the de-correlated up-mixed audio signal to a third loudspeaker to generate a third sound signal. The method further includes picking up the first, second and third sound signals with a microphone to generate a microphone output signal; and adaptively filtering the microphone output signal with an acoustic echo canceller based on the left stereo audio signal, the right stereo audio signal and the de-correlated up-mixed audio signal to generate an echo compensated microphone signal.

An example system for multi-channel audio processing includes an up-mixer configured to up-mix a left stereo audio signal from a first channel and a right stereo audio signal from a second channel to generate an up-mixed audio signal for a third channel; and a de-correlator configured to de-correlate the up-mixed audio signal from the left stereo audio signal and the right stereo audio signal to generate a de-correlated up-mixed audio signal. The system further includes an adaptive acoustic echo canceller configured to echo compensate a microphone output signal based on the left stereo audio signal, the right stereo audio signal and the de-correlated up-mixed audio signal.

Other systems, methods, features and advantages will be, or will become, apparent to one with skill in the art upon examination of the following detailed description and appended figures. It is intended that all such additional systems, methods, features and advantages be included within this description.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1:
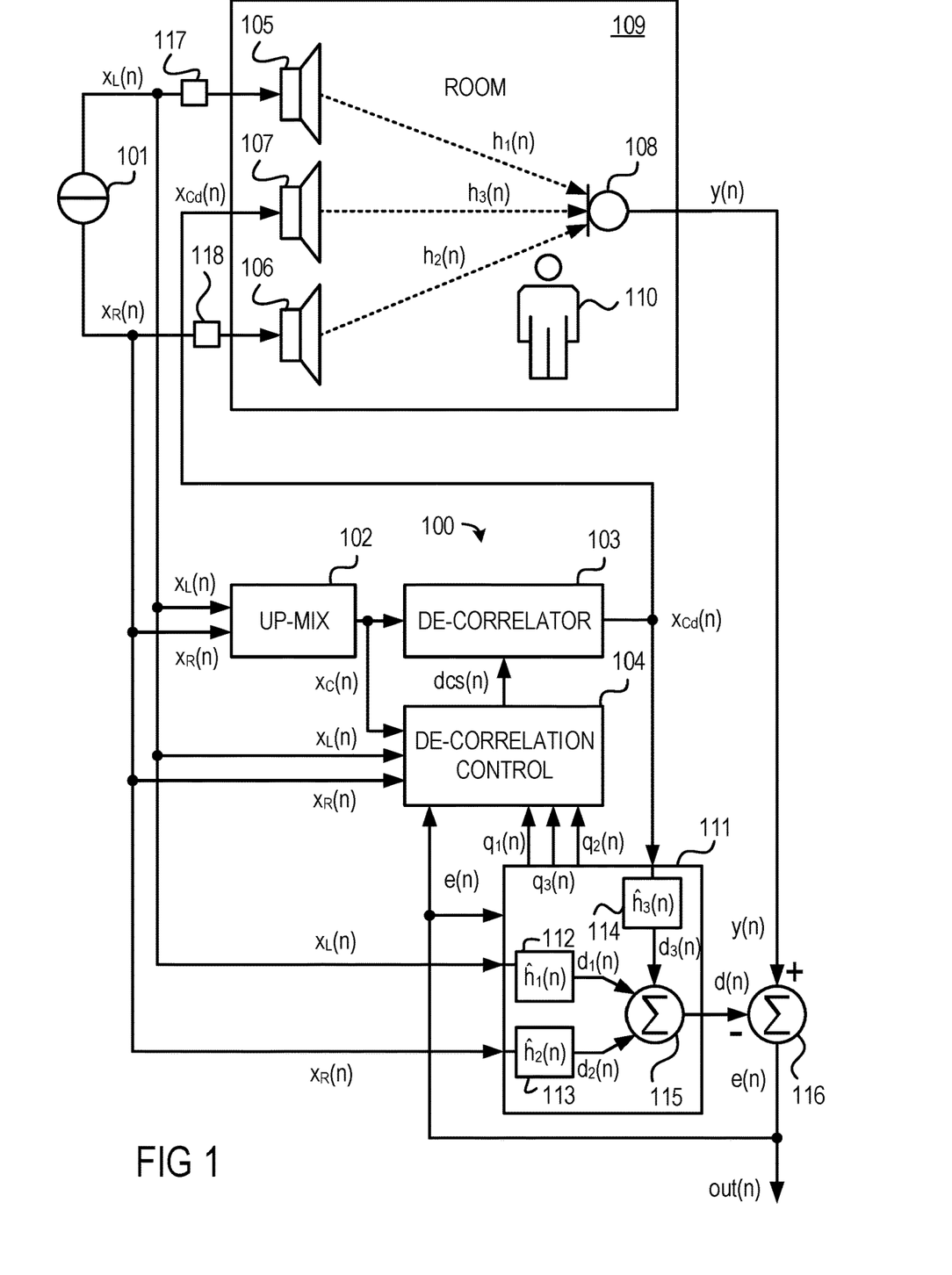
FIG. 1 is a schematic diagram illustrating an exemplary multi-channel audio signal processing arrangement with acoustic echo compensation.

Referring to FIG. 1, an exemplary multi-channel audio signal processing arrangement 100 receives a stereo audio signal, which includes a left (L) audio signal $x_L(n)$ and a right (R) signal $x_R(n)$, from a stereo source 101. The n=2 audio signals $x_L(n)$ and $x_R(n)$ are transformed into m≥1 additional audio signals by way of a channel up-mixer 102. For example, the n=2 audio signals $x_L(n)$ and $x_R(n)$ may be up-mixed into m=4 additional (e.g., surround sound) audio signals that correspond in total to n+m=6 respective channels (e.g., according to 5.1 standard) referred to as front left (FL) channel, front right (FR) channel, center (C) channel, low-frequency effects (LF) channel, surround left (SL) channel, and surround right (SR) channel. Known up-mixing algorithms are, for example, Dolby Pro Logic® or Harman Logic 7®. For the sake of simplicity, in the example shown in FIG. 1, it is assumed that m=1 so that, in addition to the two original audio signals $x_L(n)$, $x_R(n)$, an additional center (C) audio signal $x_C(n)$, which may correspond to the C channel of a 5.1 surround sound system, is generated.

Stereo input signals, as herein represented by audio signals $x_L(n)$ and $x_R(n)$, have been found to mainly be sufficiently de-correlated from each other. However, the additional center audio signal $x_C(n)$ exhibits some considerable correlation with either of original audio signals $x_L(n)$ and $x_R(n)$. Therefore, a so-called ambiguity problem may arise. For example, two input signals that are identical and, thus, exhibit full correlation, would make each of two adaptive filters for estimating two real transfer functions, which describe the acoustic paths between each of two loudspeakers and one microphone, converge to the mean of the two real transfer functions. To achieve that each adaptive filter models exactly only one of the real transfer functions, it is important that (ideally fully) de-correlated input signals are used. Otherwise, the estimated transfer functions will reflect a mixture of the real transfer functions in which the grade of mixture directly depends on the grade of de-correlation of the input signals.

The exemplary multi-channel audio arrangement 100 further includes a de-correlator, e.g., a de-correlation processor 103, which is coupled with the channel up-mixer 102 to receive, e.g., the center audio signal $x_C(n)$, and an optional de-correlation controller 104, which is coupled with the channel up-mixer 102 and the stereo audio signal source 101 to receive the center audio signal $x_C(n)$ and the two original signals $x_L(n)$, $x_R(n)$. The controller 104 is connected to or in any other way operatively coupled with the de-correlation processor 103 and may control various functions of the de-correlation processor 103 via a time-varying control signal dcs(n). The multi-channel audio arrangement 100 may include more than one channel in addition to the two original signals $x_L(n)$, $x_R(n)$ which form the stereo channels. The de-correlation processor 103 generates a de-correlated signal, e.g., center audio signal $x_{Cd}(n)$, based on the center audio signal $x_C(n)$. In another example, the de-correlation processor 103 may operate with fixed parameters so that the de-correlation controller 104 and the signals paths thereto can be omitted. In still another example, the de-correlation processor 103 may include or implement time-varying all-pass filters.

The de-correlated center audio signal $x_{Cd}(n)$ and the original signals $x_L(n)$ and $x_R(n)$ are supplied (via filters, amplifiers, wired and wireless connections etc. as the circumstances require) to transducers such as loudspeakers that convert electric signals into sound. In the example shown in FIG. 1, a loudspeaker 105 is supplied with the left signal $x_L(n)$, a loudspeaker 106 is supplied with the right signal $x_R(n)$, and a loudspeaker 107 is supplied with the de-correlated center audio signal $x_{Cd}(n)$. The original signals $x_L(n)$ and $x_R(n)$ may be delayed or phase compensated along their signal paths to the loudspeakers 105 and 106 to compensate for the delay(s) that may be imposed on the de-correlated center audio signal $x_{Cd}(n)$ by at least one of the channel up-mixer 102 and the de-correlation processor 103. The loudspeakers 105, 106 and 107 and a transducer that converts sound into electrical signals, a microphone 108, are part of a loudspeaker-room-microphone (LRM) system 109. The loudspeakers 105 and 106 broadcast sound based on the per se de-correlated original audio signals $x_L(n)$ and $x_R(n)$ and loudspeaker 107 broadcasts sound based on the de-correlated center audio signal $x_{Cd}(n)$ after being de-correlated from the two stereo audio signals $x_L(n)$ and $x_R(n)$ by de-correlation processor 103, i.e., based on the de-correlated center audio signal $x_{Cd}(n)$. The microphone 108 picks up sound transferred from the loudspeakers 105, 106 and 107 via acoustic paths described by transfer functions $h_1(n)$, $h_2(n)$ and $h_3(n)$ to provide a microphone output signal y(n). The first and second channels may be stereo channels or may be separate channels of a multi-channel system. The loudspeakers 105, 106 and 107 may be replaced by groups of loudspeakers, each including more than one loudspeaker. The microphone 109 may acquire a "desired" speech signal from a person in the room, referred to as speaker 110 and may also acquire "undesired" signals, e.g., echoes, from the loudspeakers 105, 106 and 107.

A triple-channel acoustic echo canceller 111, which receives the original audio signals $x_L(n)$ and $x_R(n)$, the de-correlated center audio signal $x_{Cd}(n)$, and the microphone signal y(n) may include three adaptive filters 112, 113 and 114 which estimate (model) the transfer functions $h_1(n)$, $h_2(n)$ and $h_3(n)$ of the LRM system 109 and adjust estimated transfer functions $\hat{h}_1(n)$, $\hat{h}_2(n)$ and $\hat{h}_3(n)$. The three adaptive filters 112, 113 and 114 output signals $d_1(n)$, $d_2(n)$, $d_3(n)$ that represent the original audio signals $x_L(n)$, $x_R(n)$ and the de-correlated center audio signal $x_{Cd}(n)$ after being filtered with the respective estimated transfer function $\hat{h}_1(n)$, $\hat{h}_2(n)$ and $\hat{h}_3(n)$. This means that the adaptive filter 112 filters the left audio signal $x_L(n)$ according to transfer function $\hat{h}_1(n)$, the adaptive filter 113 filters the right audio signal $x_R(n)$ according to transfer function $\hat{h}_2(n)$ and the adaptive filter 114 filters the de-correlated center audio signal $x_{Cd}(n)$ according to transfer function $\hat{h}_3(n)$. A summer 115 sums up the signals $d_1(n)$, $d_2(n)$, $d_3(n)$ output by the adaptive filters 112, 113 and 114 to provide an estimated echo signal d(n) which is representative of an estimation of the signal y(n) from the microphone 108 when no speaker 110 is active or no background noise is present. The estimated echo signal d(n) is subtracted from the microphone output signal y(n) in a subtractor 116 to provide an error signal e(n) which may be supplied to the de-correlation controller 104 and which forms output signal out(n) representative of the pure, echo-free sound generated by the speaker 110. Delay elements 117 and 118 (alternatively phase compensation elements such as allpasses) may be inserted in paths downstream of the loudspeakers 105, 106 and downstream of nodes in the paths transferring the original audio signals $x_L(n)$ and $x_R(n)$ to the loudspeakers 105 and 106, at which nodes the original audio signals $x_L(n)$ and $x_R(n)$ are tapped for the channel up-mixer 102, to partly or fully compensate for delays of the up-mixed signal(s) caused by at least one of the channel up-mixer 102 and the de-correlator 103.

The transfer functions of the adaptive filters 112, 113 and 114, i.e., estimated transfer functions $\hat{h}_1(n)$, $\hat{h}_2(n)$ and $\hat{h}_3(n)$, may be dynamically adjusted separately for each channel. This may improve the quality of the microphone output signal y(n) and may improve the intelligibility of a speech signal detected by the microphone 108. The de-correlation processor 103 may de-correlate the center audio signal $x_C(n)$ optionally based on the performance or the adaptation state of the adaptive filters 112, 113 and 114. If the optional controller 104, which is operatively coupled with the acoustic echo canceller 111, determines that the adaptive filters 112, 113 and 114 are not adequately adapting, the controller 104 may control the de-correlation processor 103 to de-correlate the center audio signal $x_C(n)$. If the controller 104 determines that the adaptive filters 112, 113 and 114 are adapting sufficiently, the controller 104 may control the de-correlation processor 120 to maintain or reduce the degree of de-correlation.

The controller 104 may analyze the original audio signals $x_L(n)$ and $x_R(n)$ and the additional center audio signal $x_C(n)$ to determine a correlation between these signals. If the correlation is below a predetermined threshold, the controller 104 may surpass, inhibit or deactivate the de-correlation processor 103. If the de-correlation processor 103 is surpassed, inhibited or deactivated, i.e., is inactive, the de-correlated center audio signal $x_{Cd}(n)$ is identical with the "unprocessed" center audio signal $x_C(n)$, which means that the output signal of the de-correlation processor 103 is identical with or is a delayed copy of its input signal. If the correlation exceeds the predetermined threshold, the de-correlation processor 103 may start, continue or resume de-correlation of the center audio signal $x_C(n)$.

The optional controller 104 may further receive signals $q_1(n)$, $q_2(n)$, $q_3(n)$ representative of the adaptation state of adaptive filters 112, 113 and 114, and may further receive the error signal $e(n)$. The controller 104 may determine the adaptation performance of the adaptive filters 112, 113 (114) to control the degree of de-correlation provided by the de-correlation processor 103 based on the adaptation performance of the adaptive filters 112, 113 and 114. The degrees of correlation between the center audio signal $x_C(n)$ and the left stereo audio signal $x_L(n)$ and between the center audio signal $x_C(n)$ and the right stereo audio signal $x_R(n)$ may be calculated using a short time correlation algorithm. The degree of correlation may also be determined based on the short time coherence of the signals. De-correlating may be performed if the short time correlation or short time coherence, or their respective mean values, exceed a predetermined threshold value. Such values may range, for example between about 0.96 and about 0.99.

The mean short time coherence may be calculated by averaging over frequency and time after performing a discrete Fourier transformation in a sub-band μ according to the following equations:

$$\overline{C}(n) = \lambda \overline{C}(n-1) + (1-\lambda) \sum_{\mu=0}^{\frac{N_{DFT}}{2}} C(\Omega_\mu, n)$$

$$C(\Omega_\mu, n) = \frac{|\langle X_C(\Omega_\mu, n) X^*_{L,R}(\Omega_\mu, n)\rangle|^2}{\langle |X_C(\Omega_\mu, n)|^2\rangle} \text{ with}$$

$$\mu \in \left[0, \frac{N_{DFT}}{2}\right]$$

wherein the Fourier spectra $X_{1,2}(\Omega_\mu, n)$ for the μ-th sub-band have a center frequency $\Omega_\mu$ of the discrete time point (sampling instant n). The symbol < > indicates smoothing in time, e.g., by a first order infinite impulse response filter, and the asterisk indicates the complex conjugate. The number of the nodes or sampling points of the discrete Fourier transform (DFT) spectra is given by $N_{DFT}$, and λ may be an arbitrary time constant. The arbitrary normalized time constant may range between about 0.0 and about 0.99. The value of the short time coherence may be a suitable measure or control parameter for controlling the amount of de-correlation.

Figure 2:
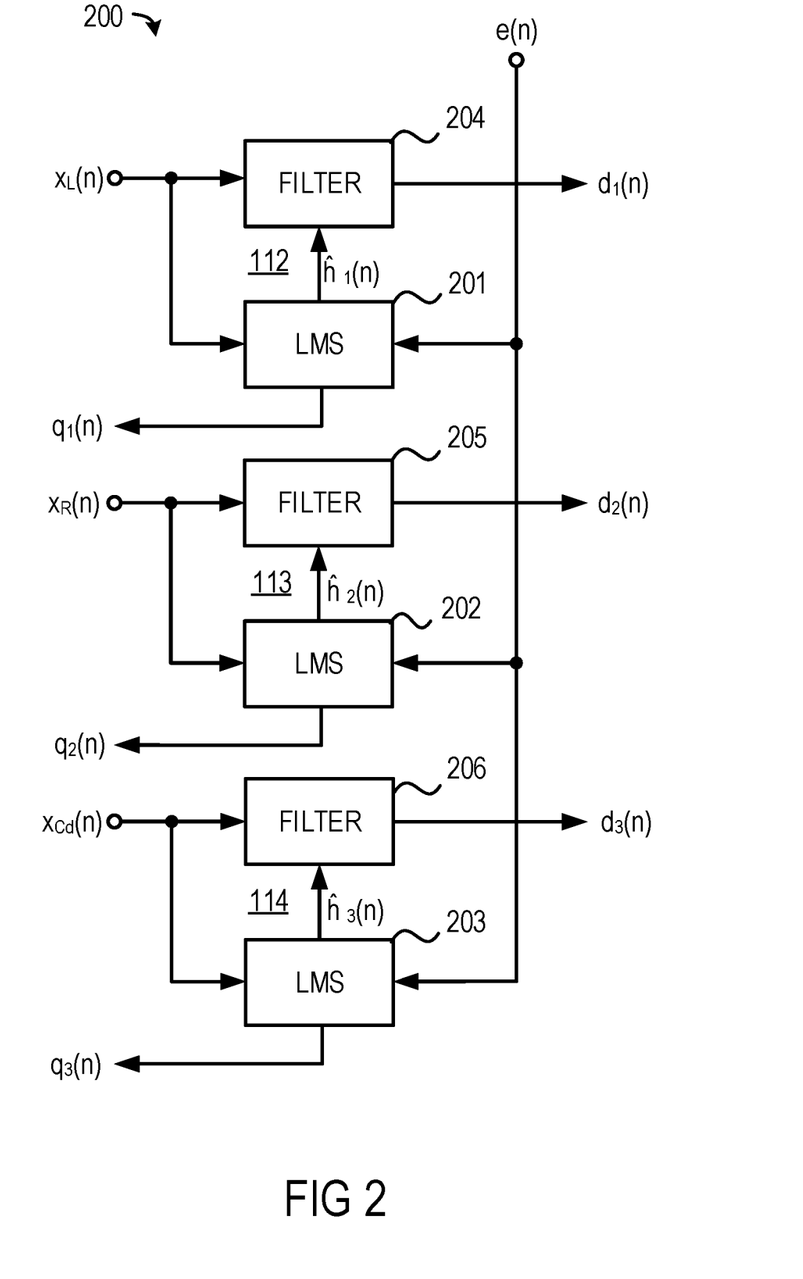
FIG. 2 is a schematic diagram illustrating an exemplary multi-channel acoustic echo cancellation filter which has three channels applicable in the signal processing arrangement shown in FIG. 1.

FIG. 2 illustrates an exemplary multi-channel acoustic echo cancellation filter 200 with three channels, which is applicable as triple-channel acoustic echo canceller 111 in the multi-channel audio arrangement 100 shown in FIG. 1. The three channels are represented by the left and right audio signals $x_L(n)$ and $x_R(n)$ and the de-correlated center audio signal $x_{Cd}(n)$. The triple-channel acoustic echo canceller 111 includes three update controllers 201, 202, 203 and three corresponding controllable filters 204, 205, 206 to form the three adaptive filters 112, 113, 114. The triple-channel acoustic echo canceller 111 estimates (models) the "real" transfer functions $h_1(n)$, $h_2(n)$ and $h_3(n)$ of the LRM system 109 via its three transfer functions $\hat{h}_1(n)$, $\hat{h}_2(n)$ and $\hat{h}_3(n)$. The controllable filters 204, 205, 206 may be Finite Impulse Response (FIR) filters whose filter coefficients or filter weights are updated with predetermined step sizes by the corresponding update controllers 201, 202, 203 by correlating the error signal $e(n)$ with each of the two audio signals $x_L(n)$, $x_R(n)$ and the de-correlated center audio signal $x_{Cd}(n)$. By convolving each of the two audio signals $x_L(n)$ and $x_R(n)$ and the center audio signal $x_{Cd}(n)$ with the respective transfer function $\hat{h}_1(n)$, $\hat{h}_2(n)$ and $\hat{h}_3(n)$ in the respective controllable filter 204, 205, 206, the acoustic echo canceller 111 estimates the unknown acoustic echoes, indicated by the estimated echo signals $d_1(n)$, $d_2(n)$, $d_3(n)$ which are output by controllable filters 204, 205, 206. These estimates of the acoustic echoes, estimated echo signals $d_1(n)$, $d_2(n)$, $d_3(n)$, are summed up by summer 115 to form the signal $d(n)$ which is subtracted from the microphone signal $y(n)$ by subtractor 116 as shown in FIG. 1. Optional signals $q_1(n)$, $q_2(n)$, $q_3(n)$ may be indicative of how accurate/inaccurate the respective adaptations and, thus, estimations are.

Figure 3:
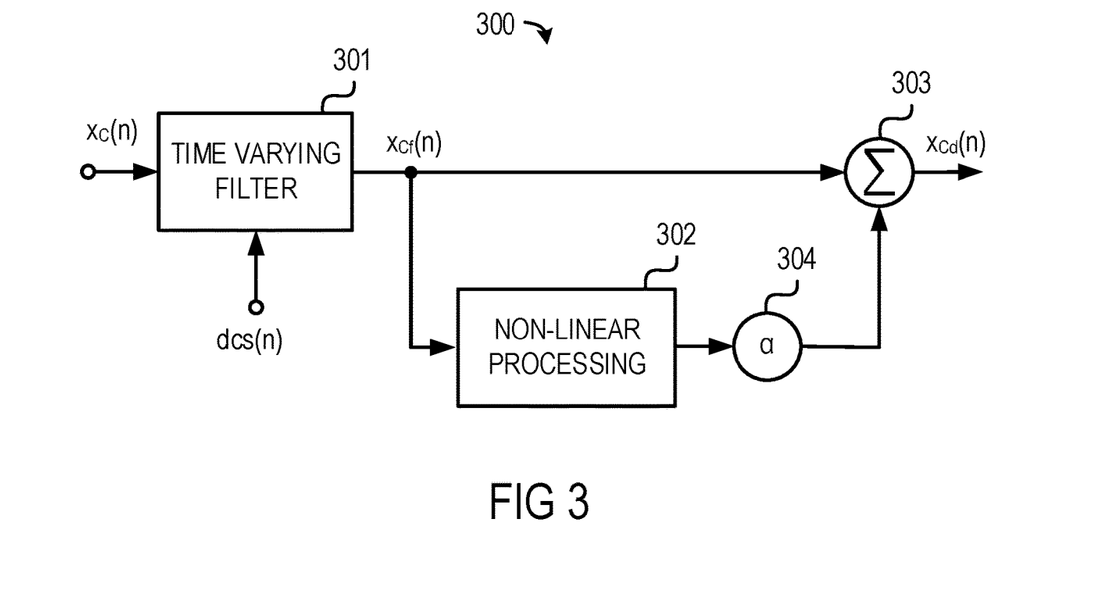
FIG. 3 is a schematic diagram illustrating an exemplary de-correlation processor operating in the time domain applicable in the signal processing arrangement shown in FIG. 1.

FIG. 3 illustrates an exemplary de-correlation processor 300 applicable as de-correlation processor 103 in the signal processing arrangement shown in FIG. 1. The single channel de-correlation processor 300 includes a time-varying filter 301 with, e.g., and may optionally further include a non-linear processing unit 302, such as a half-wave rectifier. The time-varying filter 301 may include one or more all-pass filters, e.g., finite impulse response delay filter(s), which may have multiple (fixed or controllable) parameters, e.g., filter coefficients. The controller 104 may optionally control the calculation of the filter coefficients $\beta(n)$ of the all-pass filters in the time-varying filter 301 via the optional control signal $dcs(n)$. The filter coefficients $\beta(n)$ may be controlled, e.g., based on the performance of the adaptive filters 112, 113 and 114. The non-linear processing unit 302 receives a filtered signal $x_{Cf}(n)$ from an output of the time-varying filter 301. A summer 303 combines (sums up) the filtered signal $x_{Cf}(n)$ from an output of the time-varying filter 301 and an output signal of the non-linear processing unit 302 multiplied with a factor α or α(n) by a coefficient element 304 to provide the first channel de-correlated output signal $x_{Cd}(n)$.

The filtered signal $x_{Cf}(n)$ may be processed by the non-linear processing unit 302 according to following equation:

$$x_{Cd}(n) = \begin{cases} (1+\alpha)x_{Cf}(n), & \text{if } x_{Cf}(n) > 0 \\ x_{Cf}(n), & \text{else} \end{cases}$$

wherein α may be an arbitrary parameter representing a degree of the non-linearity controlled by the controller 104. In some applications, after initiation of the de-correlation by the all-pass filter in time-varying filter 301 and the non-linear processing unit 302, the value of a may be reduced after a predetermined period of time, e.g., after about a few seconds. This may reduce perceivable audio artifacts that may be caused by de-correlation.

The time-varying filter 301 may provide a delay in the signal path. The non-linear processing unit 302 may provide non-linearity in the signal path of the center audio signal $x_C(n)$ according to the following equation:

$$x_{Cd}(n) = \begin{cases} (1+\alpha)x_C(n), & \text{if } x_C(n) > 0 \\ x_C(n), & \text{else} \end{cases}$$

wherein $\alpha$ may be an arbitrary parameter representing the degree of the non-linearity.

The de-correlated center audio signal $x_{Cd}(n)$ may be robust in terms of convergence. The time-varying filtering may be performed by (first order, recursive) all-pass filtering according to the following equation:

$$x_{Cf}(n) = -\beta(n)x_C(n) + x_C(n-1) + \beta(n)x_{Cf}(n-1)$$

where $\beta$ is a time-varying parameter, n is the discrete time index, $x_C(n)$ is an audio signal of one channel, the center channel (center audio signal), and $x_{Cf}(n)$ denotes the filtered center audio signal. The parameter $\beta$ or $\beta(n)$ may be a different value for each channel if more than one additional channel is utilized, and may be varied slowly in time with $\beta \in [-0.1, 0.1]$. Alternatively, other orders and/or non-recursive filters such as finite impulse response filters can be utilized.

Figure 4:
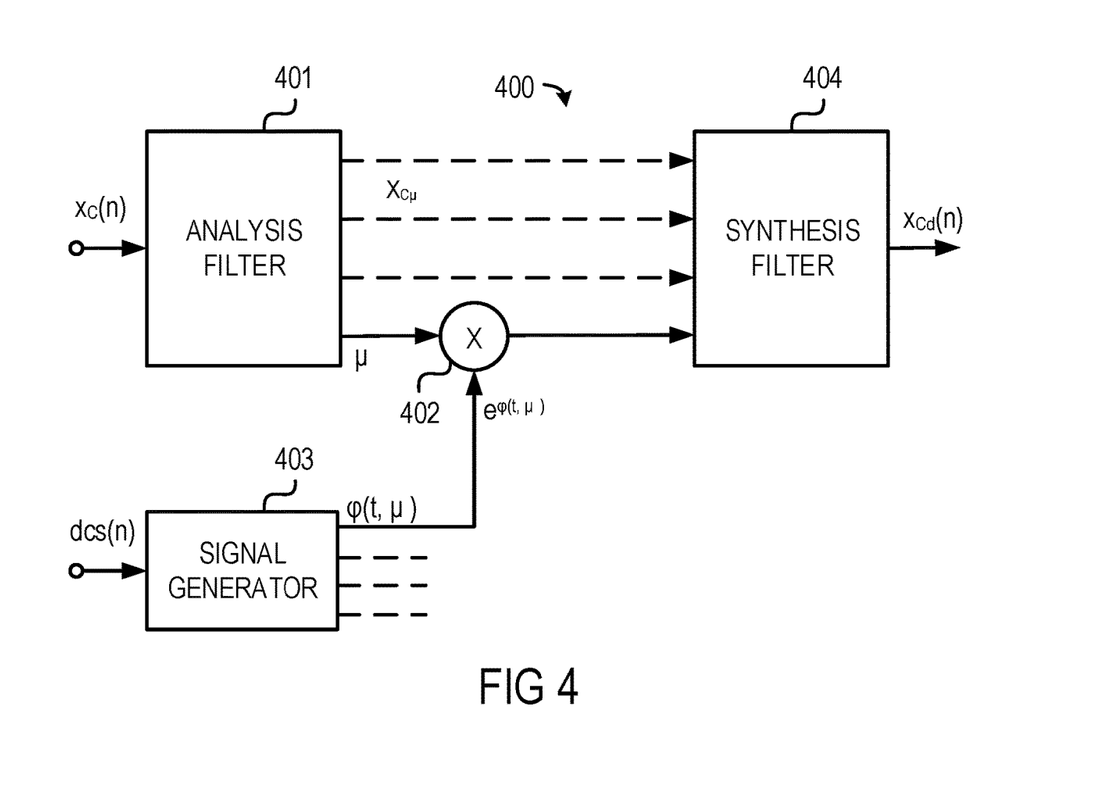
FIG. 4 is a schematic diagram illustrating an exemplary de-correlation processor operating in the frequency domain applicable in the signal processing arrangement shown in FIG. 1.

The de-correlation processor 300 shown in FIG. 3 and, thus, its allpass filter(s) operate(s) in the time domain. As an alternative to allpass filters operated in the time domain, an exemplary de-correlation processor 400 which operates in the frequency domain may be utilized as shown in FIG. 4. The de-correlation processor 400 includes a time-to-frequency domain transformer such as an analysis filter bank 401 (shown) or a Fast Fourier Transformation (FFT) unit or a derivate thereof (not shown) to transform the center audio signal $x_C(n)$ from the time domain into the frequency domain or subband domain, represented by a multiplicity of frequency domain signals $X_{C\mu}$, wherein each signal is indicative of a certain sub-band $\mu$ of the discrete spectrum of the center audio signal $x_C(n)$. Each frequency domain signal $X_{C\mu}$ is multiplied by way of a multiplicity of multipliers 402 with a modulation signal $M = e^{j\varphi(t,\mu)}$ which is generated by a controllable signal generator 403 and which optionally may be controlled by the signal dcs(n). The frequency domain signals $X_{C\mu}$, after being multiplied with the modulation signal M, is transformed back into the time domain by a frequency-to-time domain transformer such as an synthesis filter bank 404 (shown) or an Inverse Fast Fourier Transformation (IFFT) unit or a derivate thereof (not shown). In the de-correlation processor 400 shown in FIG. 4, the time-varying phase difference between the output signals is produced by a modulator function $\varphi(t,\mu)$ which is scaled differently for each sub-band $\mu$. As a consequence of the phase modulation, a frequency modulation is introduced with a frequency shift that is proportional to the temporal derivative of the phase modulation function. Therefore, in order to avoid a perceptible frequency modulation of the output signal, a smooth modulating function may be chosen, such as a sine wave at a relatively low modulation frequency, or a sufficiently smooth random function.

Figure 5:
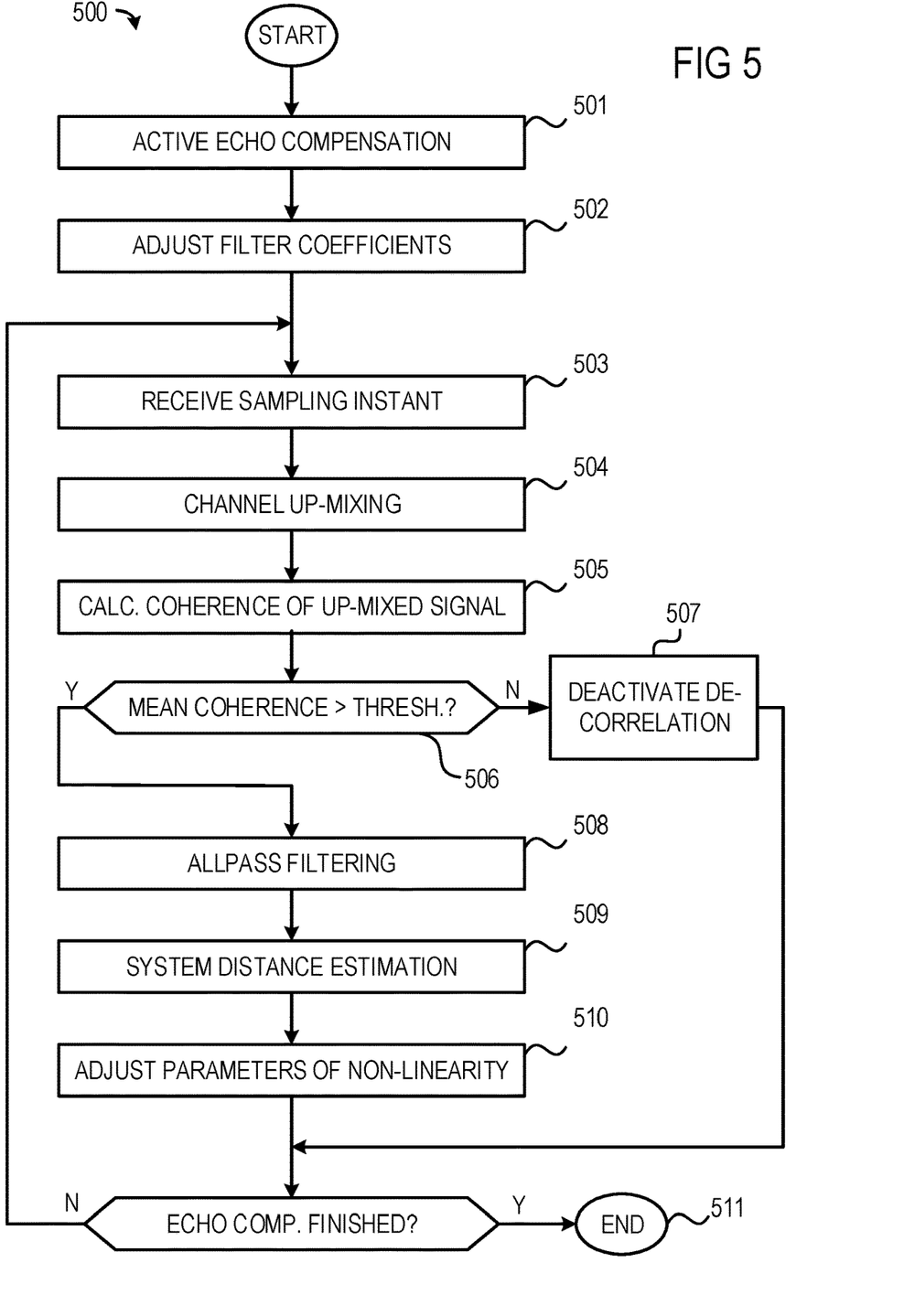
FIG. 5 is a flow chart illustrating an exemplary echo suppression process applicable in the signal processing arrangement shown in FIG. 1.

In an exemplary echo reduction process 500 depicted in FIG. 5, the microphone 108 acquires signals produced by several loudspeakers 105, 106, 107, where each loudspeaker 105, 106, 107 broadcasts a signal that corresponds to one channel. The echo compensation processing is activated (procedure 501) when a signal is detected. The filter coefficients of the acoustic echo canceller 111 may be adjusted by the optional controller 104 or may be fixed (predetermined) to reduce acoustic echoes (procedure 502). The next sampling instant or signal frame of the stereo audio signals $x_L(n)$ and $x_R(n)$ received from the source 101 (procedure 503) is converted into sound by the loudspeakers 105 and 106 and is up-mixed to the center audio signal $x_C(n)$ (procedure 504). The signal $x_C(n)$ is broadcast by loudspeaker 107. The mean short time coherence of the center audio signal $x_C(n)$ is calculated (procedure 505) by averaging over frequency and time according to the following equations:

$$\overline{C}(n) = \lambda \overline{C}(n-1) + (1-\lambda) \sum_{\mu=0}^{\frac{N_{DFT}}{2}} C(\Omega_\mu, n)$$

$$C(\Omega_\mu, n) = \frac{|\langle X_C(\Omega_\mu, n) X_{L,R}^*(\Omega_\mu, n)\rangle|^2}{\langle |X_C(\Omega_\mu, n)|^2\rangle} \text{ with}$$

$$\mu \in \left[0, \frac{N_{DFT}}{2}\right]$$

and the Fourier spectra $X_{L,R,C}(\Omega\mu,n)$ for the $\mu$-th sub-band has a center frequency $\Omega_\mu$ of the discrete time point (sampling instant n). The symbol $<>$ indicates smoothing in time, for example, by a first order infinite impulse response filter, and the asterisk indicates the complex conjugate. The number of the nodes or sampling points of the discrete Fourier transform (DFT) spectra may given by $N_{DFT}$. The term $C(\Omega_\mu,n)$ may be given by the ratio of the root mean square of the cross periodogram, that is, the root mean square of the complex short-time cross power density spectrum and the product of the auto periodograms. The time constant $\lambda$ may range from about 0.9 to about 99.

If the amount of correlation between the signals is not above a predetermined threshold (procedure 506), the de-correlation processor 103 may be deactivated or the degree of de-correlation may be reduced (procedure 507). The parameter $\beta(n)$ may remain substantially constant over multiple sampling periods. For example, $\beta(n)$ may be about 0.1 over a period of about one second. The parameter $\beta(n)$ may assume a value of about $-0.1$ through linear interpolation over about 200 sampling periods. Such modeling may result in unperceivable artifacts in the first and second channel loudspeaker output signals.

The amount of de-correlation may be increased. The time-varying filtering may be complemented by non-linear processing of the filtered signals $x_{Cf}(n)$. Previous all-pass filtering may have obtained a minimum convergence velocity for the overall adaptation of the first and second echo compensation filters. Non-linear processing may be performed according to the following equation:

$$x_{Cd}(n) = \begin{cases} (1+\alpha)x_{Cf}(n), & \text{if } x_{Cf}(n) > 0 \\ x_{Cf}(n), & \text{else} \end{cases}$$

Non-linear processing and/or all-pass processing (procedure 508) may initially be performed using a value for parameter $\alpha$ of about 0.7. The parameter (degree) a of the non-linearity may be adapted. The system distance D(n) may be periodically calculated (procedure 509) according to the following equation:

$$D(n) = 10 \log_{10}\left(\frac{1}{3 \cdot N_T} \sum_{i=0}^{N_T-1} \left(\hat{h}_{1,i}^2(n) + \hat{h}_{2,i}^2(n) + \hat{h}_{3,i}^2(n)\right)\right)$$

where $N_T$ is a pre-determined number of sampling times, and $\hat{h}_1(n)$, $\hat{h}_2(n)$ and $\hat{h}_3(n)$ are the impulse responses, resp. (time domain) filter coefficients of the adaptive filters 112, 113, 114.

The strength or amount of de-correlation using non-linear processing and/or time-varying filtering parameter β may optionally depend on the adaptation state or performance of the echo compensation filters. The system distance may measure the performance of the adaptive filters 112, 113, 114. By controlling parameter α(n) based on the system distance D(n), artifacts in the processed audio signals may be minimized. A mapping of the system distance D(n) to a value for parameter α(n) for the non-linear processing may be performed using a table, calculation or other structure. The system distance D(n) may be recalculated after the parameter β has been varied for about one second. The parameter α(n) of the non-linear processing (e.g., half-wave rectification) may be set according to the following criteria:

$$\alpha(n) = \begin{cases} 0.7, & \text{if } D(n) > -15 \text{ dB} \\ 0.5, & \text{if } -15 \text{ dB} \geq D(n) > -20 \text{ dB} \\ 0.3, & \text{if } -20 \text{ dB} \geq D(n) > -25 \text{ dB} \\ 0.2, & \text{if } -25 \text{ dB} \geq D(n) > -30 \text{ dB} \\ 0.1, & \text{else} \end{cases}$$

If D(n) exceeds a predetermined value, the controller 104 may control the de-correlation processor 103 to minimally de-correlate the acoustic input signals $x_C(n)$ in view of stereo audio signals $x_L(n)$ and $x_R(n)$. Alternatively, the controller 104 may deactivate the de-correlation circuit 103. The measured distance D(n) may fall below the predetermined value due to changes in the LRM system 109, and the controller 104 may reactivate the de-correlation processor 103. The system distance D(n) and the filter coefficients of the time-varying filter 301 may not be calculated for each sampling instant, and may be calculated, for example, about once per second.

The amount of de-correlation may be varied after a predetermined period of time. Non-linearity may be reduced to avoid generating audible artifacts. If the LRM system 109 changes, the value of parameter α(n) may be modified in response, thus providing adequate echo compensation. If echo compensation fails to sufficiently enhance the quality of the microphone signal y(n) due to an abrupt movement of the speaker 110, de-correlating may be re-activated or enforced. Non-linear parameters may also be adjusted (optional procedure 510). If additional samples are available (procedure 511), the next sample may be processed.

Figure 6:
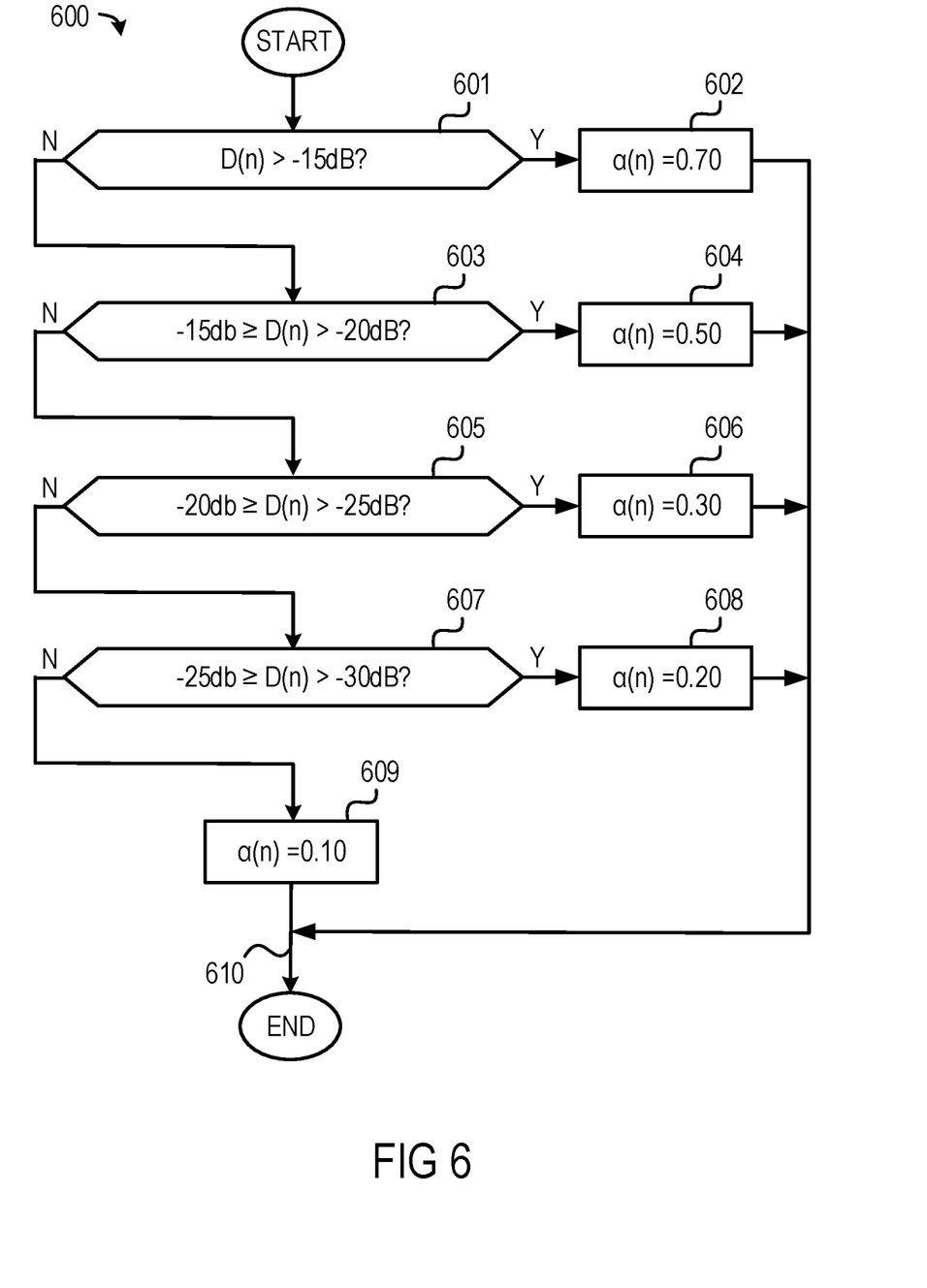
FIG. 6 is a flow chart illustrating an exemplary parameter calculation process applicable in the signal processing arrangement shown in FIG. 1.

FIG. 6 illustrates an exemplary process 600 for calculating the non-linear processing parameter α(n). If D(n) is greater than −15 dB (procedure 601), the value of parameter α(n) may be set to about 0.7 (procedure 602). If D(n) is greater than −20 dB, but less than or equal to about −15 dB (procedure 603), the value of parameter α(n) may be set to about 0.5 (procedure 604). If D(n) is greater than about −25 dB, but less than or equal to about −20 dB (procedure 605), the value of parameter α(n) may be set to about 0.3 (procedure 606). If D(n) is greater than about −30 dB, but less than or equal to about −25 dB (procedure 607), the value of parameter α(n) may be set to about 0.2 (procedure 608). If D(n) is not greater than about −30 dB (procedure 609), the value of α(n) may be set to about 0.1 (procedure 610).

The multi-channel audio arrangement 100 shown in and described above in connection with FIG. 1 may be modified in a multiplicity of ways. Each modification can be implemented per se or in combination with any other modification or modifications described in connection with multi-channel audio arrangement 700 shown in FIG. 7. One modification includes that up-mixing in the channel up-mixer 102 delivers not only one but also a multiplicity R≥1 of channels in addition to the two stereo channels. Accordingly, the de-correlator 103 of the multi-channel audio arrangement 100 is replaced by a multichannel de-correlator 703 and the triple-channel acoustic echo canceller 111 is extended to a K-channel acoustic echo canceller 711 with K>3, the K channels represented by adaptive filters 712, 713 and 714 and their transfer functions $\hat{h}_{1M}(n)$, $\hat{h}_{2M}(n)$ and $\hat{h}_{RM}(n)$.

Figure 7:
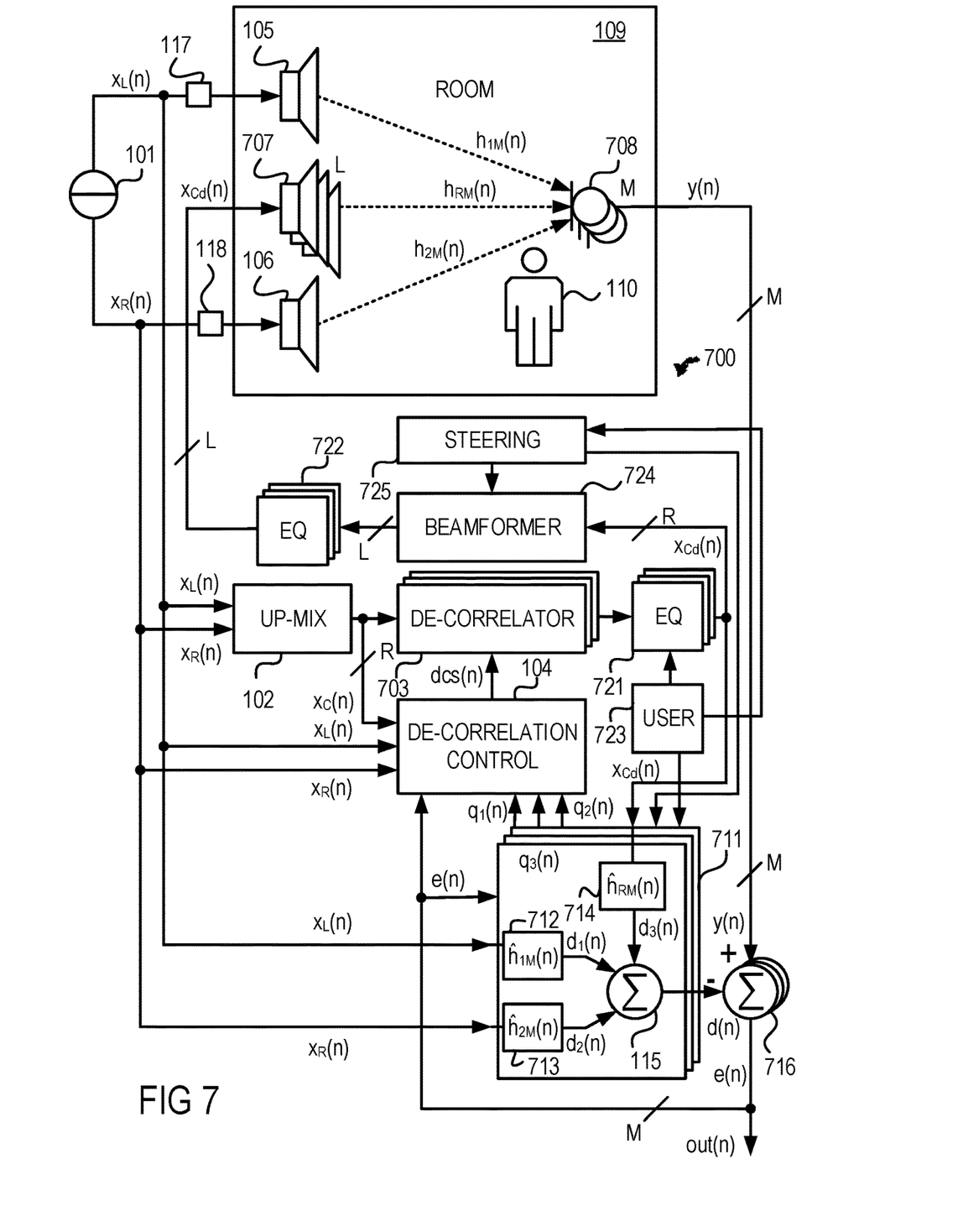
FIG. 7 is a schematic diagram illustrating the multi-channel audio signal processing arrangement shown in FIG. 1 with some modifications.

In another modification, a number L of additional loudspeakers 707 or groups of loudspeakers may include more than one additional loudspeaker 107 or group of loudspeakers so that L≥1 and the total number is L+2. Similarly in another modification, a number M of microphones 707 or groups of microphones may include more than one microphone 108 or group of microphones so that M≥1. With more than one additional loudspeaker or group of loudspeakers and/or more than one microphone or group of microphones the number of transfer functions increases to K=(L+2)×M transfer functions, indicated by $h_{1M}(n)$, $h_{2M}(n)$ and $h_{RM}(n)$. The subtractor 116 may be replaced by a multiplicity of subtractors, referred to as multi-channel subtractor 716, in order to process the multiplicity of input signals.

In other modifications, at least one of a (multi-channel) source equalizer 721, which is connected downstream of the de-correlator 703 and upstream of a node between the acoustic echo canceller 711 and the beamformer 724 (and thus the loudspeakers 707), and a (multi-channel) room equalizer 722, which is connected downstream of this node and upstream of the loudspeakers 707 and which may optionally be included in the beamformer 824. The (multi-channel) source equalizer 721 may be controllable by user via a user interface 723.

In still another modification a beamformer 724 with R input signals and L output signals (R=L or R≠L) may be inserted anywhere in a signal path between the de-correlator 703 and the loudspeaker(s) 707. The beamformer 724 may be steered by a steering control 725, which may receive a control signal representative of the gaze angle of the beamformer 724 from the user interface 723 and provide steering information to the beamformer 724 and to the acoustic echo canceller 711 to further adjust the adaptive filters therein, e.g., the update and processing of reference filter coefficient sets. In a further modification, the number of possible beam steering angles of the beamformer 724 may be limited to a minimum, and, alternatively or additionally, different reference filter coefficient sets may be at least one of built-up, collected and re-used, corresponding to different operational modes, i.e. to different steering angles θ, directivities, (omnidirectional or directional) and/or playback modes such as mono, stereo or multi-channel. In still another modification, the optional controller 104 may be designed for an independent operation, i.e., it receives no input signals such as signals $x_L(n)$, $x_R(n)$, $x_C(n)$, $q_L(n)$, $q_R(n)$, $q_C(n)$ and e(n), and may control the cut-off frequency (or the quality) of the de-correlator 703 (103), e.g., the cut-off frequency (or the quality) of the allpass filter(s) thereof, to change over time in a certain way such as a continuous, random or any other type of change.

In a further modification (not shown), the overall quality of the echo compensated signal e(n) may be enhanced by using one or more directional microphones to provide a plurality of microphone signals. An optional beam-forming structure may be used alternatively or additionally to provide directivity for the microphone array by utilizing, for example, delay compensation and summing of the individual microphone signals.

The structure, circuitry, and processing described above may be encoded in a computer-readable medium such as a CD ROM, disk, flash memory, RAM or ROM, an electromagnetic signal, or other machine-readable medium as instructions for execution by a processor. Alternatively or additionally, any type of logic may be utilized and may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The method may be implemented by software and/or firmware stored on or in a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of these and/or other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. A method for multi-channel audio signal processing, comprising:
   receiving a left stereo audio signal from a first channel, and receiving a right stereo audio signal from a second channel;
   up-mixing the left stereo audio signal and the right stereo audio signal to generate an up-mixed audio signal for a third channel;
   de-correlating the up-mixed audio signal from the left stereo audio signal and the right stereo audio signal to generate a de-correlated up-mixed audio signal;
   providing the left stereo audio signal to a first loudspeaker to generate a first sound signal, providing the right stereo audio signal to a second loudspeaker to generate a second sound signal, and providing the de-correlated up-mixed audio signal to a third loudspeaker to generate a third sound signal;
   picking up the first, second and third sound signals with a microphone to generate a microphone output signal; and
   adaptively filtering the microphone output signal with an acoustic echo canceller based on the left stereo audio signal, the right stereo audio signal and the de-correlated up-mixed audio signal to generate an echo compensated microphone signal.

2. The method of claim 1, wherein de-correlating of the up-mixed audio signal includes generating the de-correlated up-mixed audio signal by applying a time-varying all-pass filtering to the up-mixed audio signal, the time-varying all-pass filtering being based on at least one time-varying parameter.

3. The method of claim 2, wherein the at least one time-varying parameter is predetermined or controllable.

4. The method of claim 1, wherein de-correlating of the up-mixed audio signal includes transforming the up-mixed audio signal from a time domain to a frequency domain to generate a multiplicity of sub-band signals, multiplying each of the sub-band signals with a corresponding controlled modulation signal to generate modulated sub-band signals, and transforming the modulated sub-band signals from the frequency domain into the time domain to provide the de-correlated up-mixed audio signal.

5. The method of claim 1, further comprising:
determining correlations between the up-mixed audio signal and either of the left stereo audio signal and the right stereo audio signal; and
controlling de-correlation based on the determined correlations between the up-mixed audio signal and either of the first and second audio input signals.

6. The method of claim 5, wherein correlation is determined by calculating a short time correlation value or a short time coherence value of the up-mixed audio signal.

7. The method of claim 1, further comprising controlling the de-correlating based upon an adaptation state of the adaptive filtering in the acoustic echo canceller.

8. The method of claim 7, wherein the adaptation state of the acoustic echo canceller is determined on the basis of an echo compensation signal generated by the acoustic echo canceller.

9. The method of claim 7, wherein the adaptation state of the acoustic echo canceller is determined on the basis of the filter coefficients of the acoustic echo canceller.

10. The method of claim 1, further comprising delaying of the left stereo audio signal and the right stereo audio signal by a delay time or phase value that is equal to a delay time or phase value introduced into the up-mixed signal by at least one of de-correlating and up-mixing.

11. The method of claim 1, further comprising beamforming based on the up-mixed audio signal, the left stereo audio signal and the right stereo audio signal before providing the left stereo audio signal to the first loudspeaker, to provide beamformed audio signals to the first loudspeaker, second loudspeaker and the third loudspeaker.

12. The method of claim 1, further comprising:
detecting the first sound signal, the second sound signal and the third sound signal with at least one additional microphone to generate at least one additional microphone output signal; and
adaptively filtering the at least one additional microphone output signal with the acoustic echo canceller based on the left stereo audio signal, the right stereo audio signal and the de-correlated up-mixed audio signal to generate at least one additional echo compensated microphone signal.

13. The method of claim 1, further comprising:
up-mixing the left stereo audio signal and the right stereo audio signal to generate at least one additional up-mixed audio signal;
de-correlating the at least one additional up-mixed audio signal from the left stereo audio signal, the right stereo audio signal and remaining up-mixed audio signals to generate at least one de-correlated up-mixed audio signal; and
providing the at least one de-correlated up-mixed audio signal to at least one additional loudspeaker to generate at least one additional sound signal.

14. A system for multi-channel audio processing, comprising:
an up-mixer configured to up-mix a left stereo audio signal from a first channel and a right stereo audio signal from second channel to generate an up-mixed audio signal for a third channel;
a de-correlator configured to de-correlate the up-mixed audio signal from the left stereo audio signal and the right stereo audio signal to generate a de-correlated up-mixed audio signal; and
an adaptive acoustic echo canceller configured to echo compensate a microphone output signal based on the left stereo audio signal, the right stereo audio signal and the de-correlated up-mixed audio signal.

15. The system of claim 14, wherein the de-correlator is further configured to generate the de-correlated up-mixed audio signal by applying a time-varying all-pass filtering to the up-mixed audio signal, the time-varying all-pass filtering being based on at least one time-varying parameter.

16. The system of claim 15, wherein the at least one time-varying parameter is predetermined or controllable.

17. The system of claim 14, wherein the de-correlator is further configured to:
transform the up-mixed audio signal from a time domain to a frequency domain to generate a multiplicity of sub-band signals;
multiply each of the sub-band signals with a corresponding controlled modulation signal to generate modulated sub-band signals; and
transform the modulated sub-band signals from the frequency domain into the time domain to provide the de-correlated up-mixed audio signal.

18. The system of claim 14, wherein the de-correlator is further configured to:
determine correlations between the up-mixed audio signal and either of the left stereo audio signal and the right stereo audio signal; and
control de-correlation based on the determined correlation between the up-mixed audio signal and either of the first and second audio input signals.

19. The system of claim 18, wherein the de-correlator is further configured to determine correlation by calculating a short time correlation value or a short time coherence value of the up-mixed audio signal.

20. A non-transitory computer-readable medium comprising instructions which, when executed by a computer, cause the computer to:
receive a left stereo audio signal from a first channel, and receive a right stereo audio signal from a second channel;
up-mix the left stereo audio signal and the right stereo audio signal to generate an up-mixed audio signal for a third channel;
de-correlate the up-mixed audio signal from the left stereo audio signal and the right stereo audio signal to generate a de-correlated up-mixed audio signal;
provide the left stereo audio signal to a first loudspeaker to generate a first sound signal, provide the right stereo audio signal to a second loudspeaker to generate a second sound signal, and provide the de-correlated up-mixed audio signal to a third loudspeaker to generate a third sound signal;
pick up the first, second and third sound signals with a microphone to generate a microphone output signal; and
adaptively filter the microphone output signal with an acoustic echo canceller based on the left stereo audio signal, the right stereo audio signal and the de-correlated up-mixed audio signal to generate an echo compensated microphone signal.

* * * * *